United States Patent
Inaba et al.

(10) Patent No.: US 9,085,038 B2
(45) Date of Patent: Jul. 21, 2015

(54) WIRE ELECTRIC DISCHARGE MACHINE WITH WIRE ELECTRODE CUTTING MECHANISM

(71) Applicant: FANUC CORPORATION, Yamanashi (JP)

(72) Inventors: Harutora Inaba, Yamanashi (JP); Yoshinori Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 121 days.

(21) Appl. No.: 13/781,119

(22) Filed: Feb. 28, 2013

(65) Prior Publication Data
US 2013/0248494 A1     Sep. 26, 2013

(30) Foreign Application Priority Data

Mar. 21, 2012 (JP) .................................. 2012-064099

(51) Int. Cl.
*B23H 7/10* (2006.01)
*B23H 1/10* (2006.01)

(52) U.S. Cl.
CPC .................. *B23H 1/10* (2013.01); *B23H 7/102* (2013.01); *B23H 7/10* (2013.01)

(58) Field of Classification Search
CPC .................................. B23H 7/10; B23H 7/102
USPC ....................................................... 219/69.12
See application file for complete search history.

(56) References Cited

U.S. PATENT DOCUMENTS

| | | | | |
|---|---|---|---|---|
| 4,608,478 A | * | 8/1986 | Aso et al. ................... | 219/69.12 |
| 4,652,716 A | * | 3/1987 | Schneider et al. .......... | 219/69.12 |
| 5,006,692 A | * | 4/1991 | Magara et al. .............. | 219/69.12 |
| 5,045,662 A | * | 9/1991 | Yamada ...................... | 219/69.12 |
| 5,077,457 A | * | 12/1991 | Onaka et al. ................ | 219/69.12 |
| 5,130,508 A | * | 7/1992 | Umetsu et al. ............. | 219/69.12 |
| 5,753,880 A | | 5/1998 | Kajitori et al. | |
| 5,859,401 A | * | 1/1999 | Kajitori et al. ............. | 219/69.12 |
| 2008/0142487 A1 | * | 6/2008 | Sakaguchi ................. | 219/69.12 |

FOREIGN PATENT DOCUMENTS

| | | |
|---|---|---|
| EP | 0233297 A4 | 12/1988 |
| EP | 0664178 A1 | 7/1995 |

(Continued)

OTHER PUBLICATIONS

Japanese Office Action with English translation dated Apr. 23, 2013 (6 pages).

(Continued)

*Primary Examiner* — Geoffrey S Evans
(74) *Attorney, Agent, or Firm* — Lowe Hauptman & Ham, LLP (57) ABSTRACT

A wire electric discharge machine is provided with an automatic wire-connection pipe movable between an automatic wire connection position and a retracted position. A pickup unit configured to clamp a wire electrode to be cut is disposed below a wire cutting electrode on the outlet side of the automatic wire-connection pipe. The wire electric discharge machine is further provided with a stopper mechanism configured to regulate a movement of the automatic wire-connection pipe so that a distal end of a nozzle of the automatic wire-connection pipe is located between the wire cutting electrode and the pickup unit when the wire electrode is cut.

4 Claims, 8 Drawing Sheets

(56) References Cited

FOREIGN PATENT DOCUMENTS

| | | | |
|---|---|---|---|
| EP | 0770444 A1 | | 5/1997 |
| JP | 57-149126 A | * | 9/1982 |
| JP | 61-008224 A | * | 1/1986 |
| JP | 6114817 A | | 1/1986 |
| JP | 62-130129 A | * | 6/1987 |
| JP | 63120034 A | | 5/1988 |
| JP | 63123632 A | | 5/1988 |
| JP | 02237724 A | | 9/1990 |
| JP | 5253749 A | | 10/1993 |
| JP | 8-309622 A | | 11/1996 |
| JP | 957539 A | | 3/1997 |
| TW | 476687 B | | 2/2002 |

OTHER PUBLICATIONS

Extended European Search Report issued Jun. 5, 2014, corresponds to European patent application No. 13153963.7.

Office Action mailed May 5, 2014, corresponds to Chinese patent application No. 201310091798.0.

* cited by examiner

FIG. 1

WIRE BREAKAGE OCCURS

WIRE ELECTRIC DISCHARGE MACHINE WITH WIRE ELECTRODE CUTTING MECHANISM

RELATED APPLICATIONS

The present application is based on, and claims priority from, Japanese Application Number 2012-064099, filed Mar. 21, 2012, the disclosure of which is hereby incorporated by reference herein in its entirety.

BACKGROUND OF THE INVENTION

1. Field of the Invention

The present invention relates to a wire electric discharge machine with a wire electrode cutting mechanism.

2. Description of the Related Art

In wire electric discharge machining, unexpected breakage of an electrode wire may intermittently occur, depending on the complexity of the machining shape, machining conditions, physical properties of the material of a workpiece, etc. To overcome the breakage problem during the machining, a wire electric discharge machine is provided with a wire-breakage repairing program. Wire breakage repairing is performed and completed based on processes previously set in the wire-breakage repairing program. These sequential processes include occurrence of breakage during machining, rewinding of the electrode wire, return of upper and lower guides to their respective machining start points based on control of drive axes, cutting of the distal end of the electrode wire, wire connection, completion of the wire connection, return of the upper and lower guides to a breakage position, and restart of machining.

Japanese Patent Application Laid-Open No. 8-309622 discloses a technique in which the distal end portion of a wire on the wire supply side is partially cut and removed if wire breakage occurs in an electric discharge machining section during wire electric discharge machining. The wire is automatically connected in the position of a machining start hole and retraced to a wire breakage position, and electric discharge machining is restarted at the position where the wire is broken.

Figure 6:
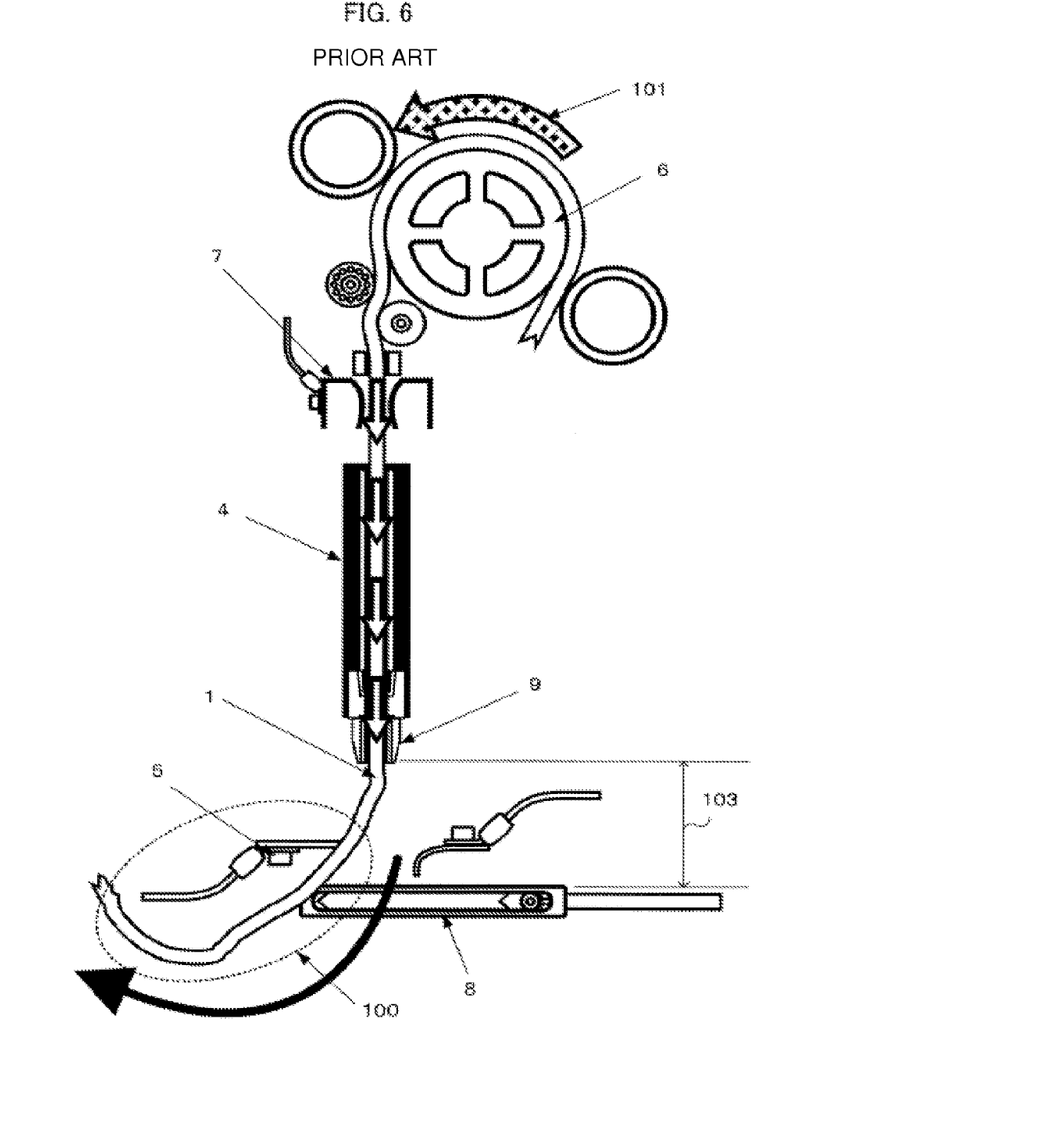
FIG. 6 is a view illustrating a prior art wire electrode cutting mechanism.

A prior art wire electrode cutting mechanism will be described with reference to FIG. 6.

In a wire-breakage repairing mode where wire breakage caused during machining is repaired, the drive axes of the wire electrode cutting mechanism are controlled so that the upper and lower guides are relatively restored to the machining start points. Thereafter, an electrode wire 1 is straightened by annealing and its distal end is cut, whereupon wire connection is started. A stress, such as abnormal electric discharge that suddenly occurs between a workpiece and the electrode wire 1, may be one of the main causes of breakage of the wire 1. Since sudden abnormal electric discharge produces high local current, it fractures the electrode wire 1 at a stroke.

The electrode wire 1 being machined is continually subjected to a tension adjusted under the machining conditions. If a sudden fracture occurs, therefore, the tension is instantaneously released, so that the electrode wire 1 is inevitably bent like a spring by reaction force. In wire breakage repairing during taper machining, in particular, the electrode wire 1 is rewound through a tapered machining groove, so that its distal end may sometimes be severely bent by contact with the workpiece as it is taken up.

In a cutting/connection mode that is activated on completion of the return of the upper and lower guides to the machining start points after the electrode wire 1 is rewound, a brake roller 6 is rotated in a wire delivery direction (indicated by arrow 101 in FIG. 6) to deliver the electrode wire 1 to a detection-unit electrode 5, in order to straighten the electrode wire 1 taken up by an AWF (auto wire feeder) pipe 4 by annealing and cut the damaged distal end of the wire.

Thereafter, cutting-start annealing torque is produced by the brake roller 6 to straighten the electrode wire 1 as the wire is cut at the position of an AWF pipe nozzle 9 near the detection-unit electrode 5 by energizing the electrode 5 and a chuck-section cutting electrode 7. To attain this, the distal end portion of the electrode wire 1 to be cut should be clamped by a pickup unit 8.

As mentioned before, the distal end of the electrode wire 1 is often extremely bent at the time of wire breakage repairing. If the degree of bending is high, the distal end of the delivered electrode wire 1 may be derailed to the outside of the pickup unit 8, failing to be inserted into the frame of the pickup unit 8 (see an extremely bent end portion 100 of the wire indicated by a broken line in FIG. 6). The electrode wire 1 having failed to be clamped by the pickup unit 8 due to derailing cannot obtain a supporting point for clamping, so that it cannot receive either cutting-start annealing torque produced by the brake roller 6 or cutting current. Inevitably, therefore, cutting failure occurs, thereby stopping the entire wire electric discharge machine.

As described above, the derailing of the electrode wire 1 implies a state in which the distal end of the electrode wire 1 is not clamped by the pickup unit 8 at the time of wire breakage repairing. According to this prior art technique, a distance 103 between the AWF pipe nozzle 9 and the pickup unit 8 is long, as indicated by arrow 102 (wire rewinding direction).

SUMMARY OF THE INVENTION

Accordingly, in view of the above problems of the prior art, the object of the present invention is to provide a wire electric discharge machine with a wire electrode cutting mechanism, capable of achieving a rapid improvement in the success rate of automatic connection of an extremely bent electrode wire produced in a wire-breakage repairing mode during machining.

A wire electric discharge machine with a wire electrode cutting mechanism according to the present invention comprises an automatic wire-connection pipe disposed upstream relative to an upper guide, having a nozzle on a distal end thereof, and movable between an automatic wire connection position near the upper guide and a retracted position, first and second wire cutting electrodes disposed on the inlet and outlet sides, respectively, of the automatic wire-connection pipe, a pickup unit disposed below the second wire cutting electrode and configured to clamp a wire electrode to be cut thereby, and a stopper mechanism configured to regulate a movement of the automatic wire-connection pipe so that the distal end of the nozzle of the automatic wire-connection pipe is located between the second wire cutting electrode and the pickup unit when the wire electrode is cut.

The stopper mechanism may comprise a notch portion on a mounting base on which the automatic wire-connection pipe is mounted and a cylinder mechanism capable of moving toward and away from the notch portion.

The cylinder mechanism may be driven by water or oil pressure or a servomotor.

The stopper mechanism may be a hand attached to a robot, and the automatic wire-connection pipe may be held by the hand.

According to the present invention, there can be provided a wire electric discharge machine with a wire electrode cutting mechanism, capable of achieving a rapid improvement in the success rate of automatic connection of an extremely bent electrode wire produced in a wire-breakage repairing mode during machining.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
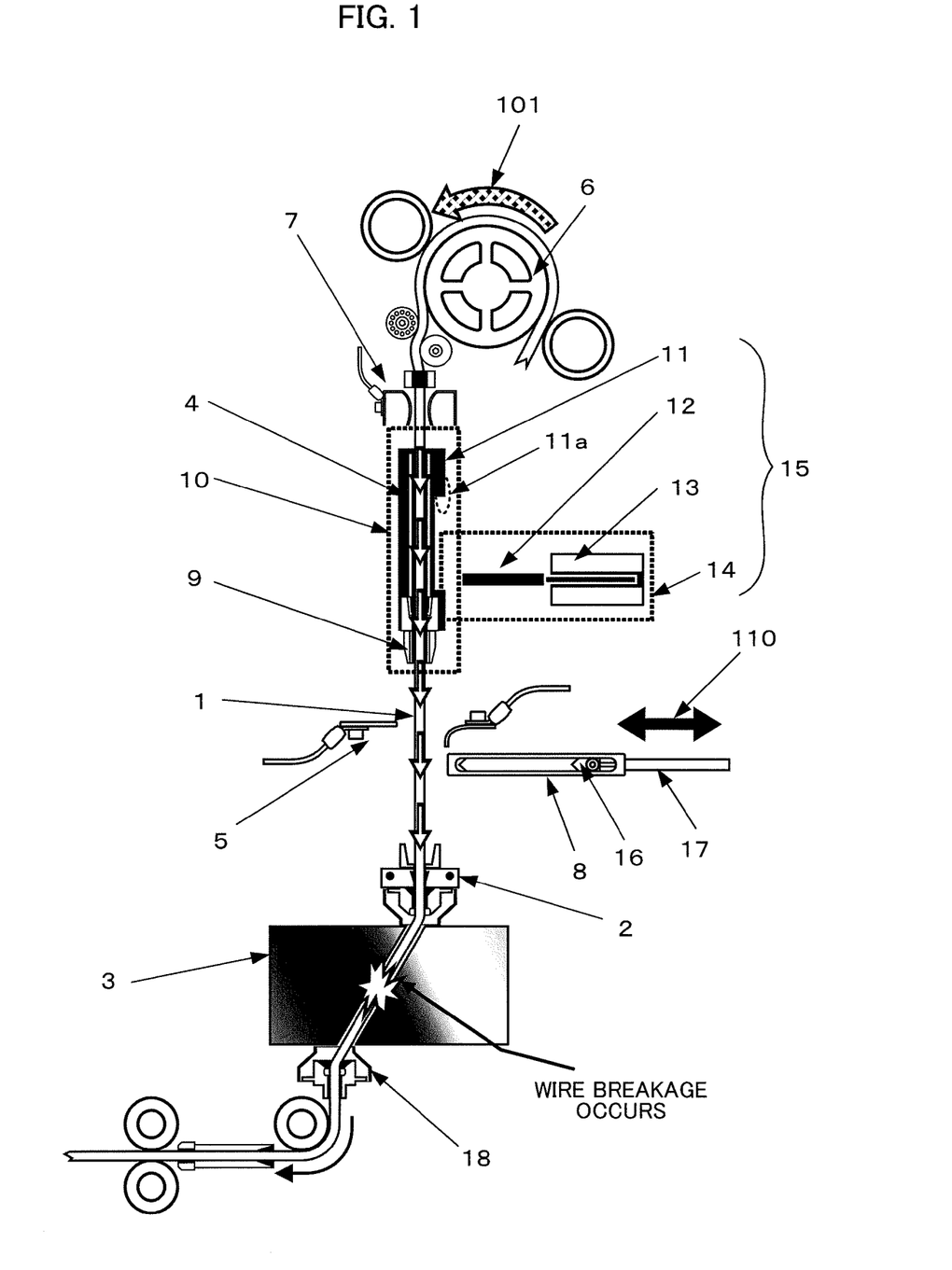
FIG. 1 is a view illustrating the operation of a wire derailing prevention device at the time of occurrence of wire breakage.
Figure 2:
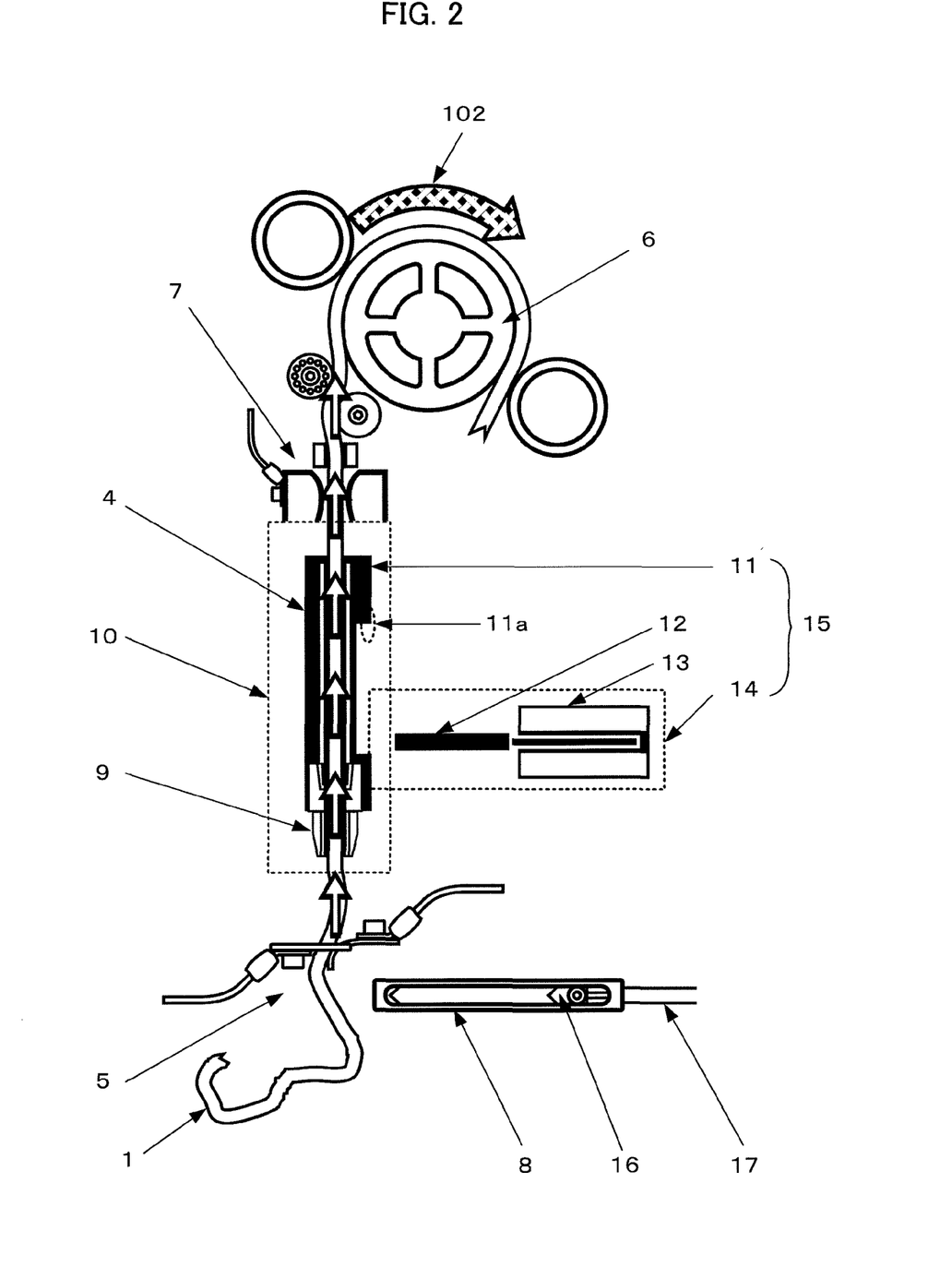
FIG. 2 is a view illustrating wire rewinding operation of the wire derailing prevention device of FIG. 1 at the time of wire breakage repairing.
Figure 3:
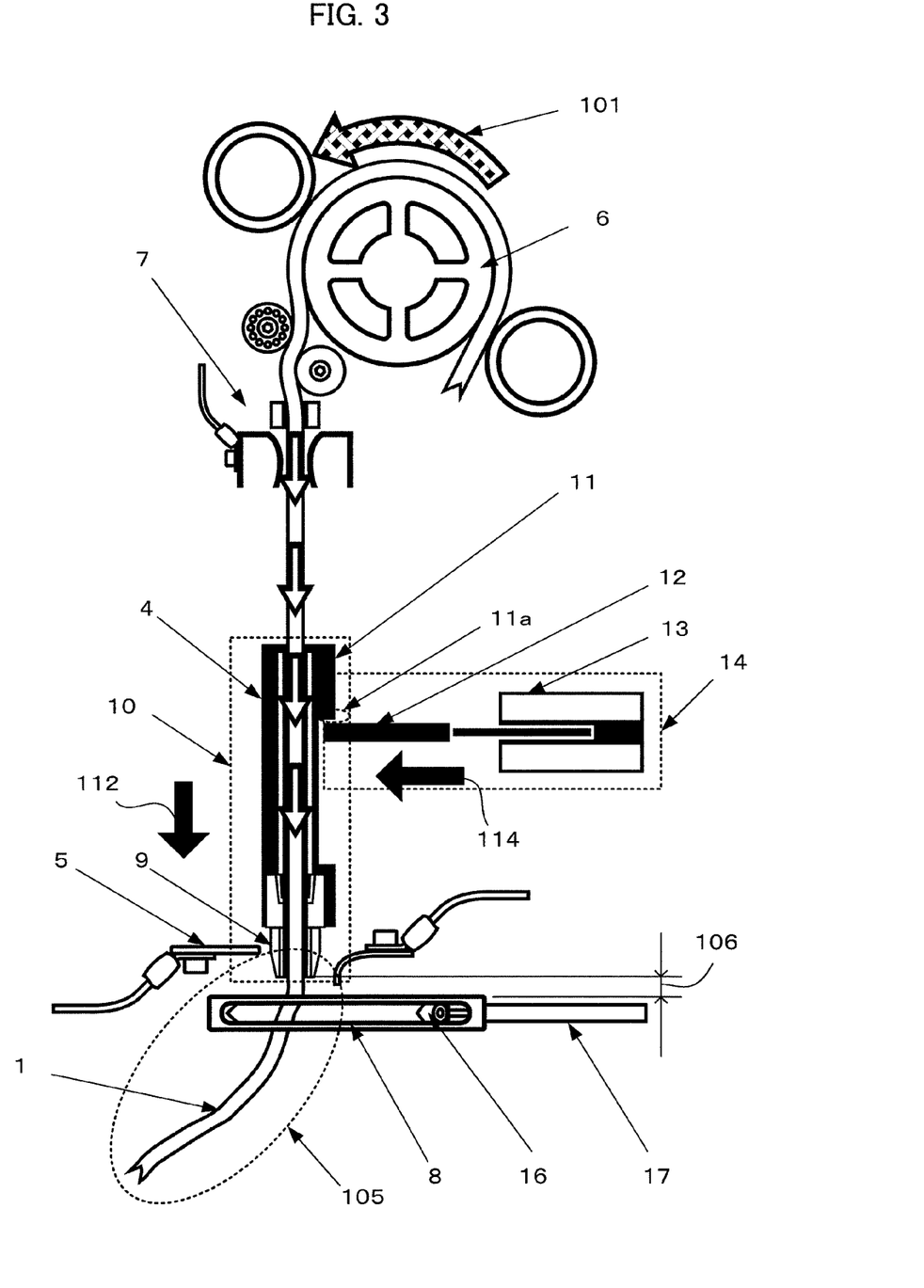
FIG. 3 is a view illustrating a state in which an electrode wire is successfully clamped by using the wire derailing prevention device of FIG. 1.

FIG. 1 is a view illustrating the operation of a wire derailing prevention device at the time of occurrence of wire breakage. FIG. 2 is a view illustrating wire rewinding operation of the wire derailing prevention device at the time of wire breakage repairing. FIG. 3 is a view illustrating a state in which an electrode wire is successfully clamped by using the wire derailing prevention device of FIG. 1.

As mentioned before, sharp bending of the distal end portion of an electrode wire 1 may be a cause of derailing of the electrode wire in a wire-breakage repairing mode. If the distal end portion of the electrode wire 1 is extremely bent, it cannot pass through a frame-like penetrating portion of a pickup unit 8. A long distance (the distance 103 in FIG. 6) from the distal end of an auto wire feeder (AWF) pipe nozzle 9 to the pickup unit 8 located at a lower part of a detection-unit electrode 5 is another cause of derailing of the electrode wire 1.

If deformation of the distal end of the electrode wire 1 is small, it is quite possible to deliver the electrode wire into the frame of the pickup unit 8. If the distal end of the electrode wire 1 is sharply bent, as mentioned before, however, it is urged to largely bulge out from the frame of the pickup unit 8 from just behind the AWF pipe nozzle 9. Since the distance 103 (FIG. 6) between the nozzle 9 and the pickup unit 8 is long, therefore, the bent electrode wire 1 is very likely to derail before it reaches the pickup unit 8.

Accordingly, a wire electric discharge machine according to the present invention comprises a derailing prevention device 15 configured to minimize the distance (denoted by numeral 106 in FIG. 3) between the AWF pipe nozzle 9 and the pickup unit 8 at the time of wire breakage, in order to suppress the occurrence of derailing of the electrode wire 1. The derailing prevention device 15 comprises an AWF pipe unit 10 and a pipe stopper device 14. The AWF pipe unit 10 comprises an AWF pipe 4, for use as automatic wire-connection pipe, and an AWF unit baseplate 11 with notch for pipe stop secured to the AWF pipe 4. The pipe stopper device 14 comprises a pipe stop arm 12 and an air cylinder 13 for driving the pipe stop arm 12.

The pipe stop arm 12 that constitutes the pipe stopper device 14 moves horizontally (in the direction of arrow 110 in FIG. 1) as operating air is introduced into and discharged from the air cylinder 13. The pipe stop arm 12 may be driven by water or oil pressure or by means of a servomotor in place of the air cylinder 13.

The pickup unit 8 has such a frame shape that it can be vertically penetrated by the electrode wire 1, and a wedge-shaped member 16 is movable along a slide hole in an opposite surface of the pickup unit 8. After the electrode wire 1 is passed through the frame of the pickup unit 8, a push rod 17 having the wedge-shaped member 16 on its distal end is moved toward the electrode wire 1. Then, the electrode wire 1 is clamped between the wedge-shaped member 16 and an inside surface of the frame shape of the pickup unit 8.

During wire-breakage repairing operation, as shown in FIGS. 2 and 3, the pipe stopper device 14 and the pickup unit 8 are driven in association with each other. The AWF pipe unit 10 is driven by drive means (not shown), such as an air cylinder, to move vertically between an automatic wire connection position and a retracted position in the range between a brake roller 6 and an upper guide 2. Alternatively, the AWF pipe unit 10 may be configured to be held by a hand of a robot as it is moved.

The pipe stopper device 14 can control the working range of the AWF pipe unit 10 from a standard position to a position just above the pickup unit 8 by inserting the pipe stop arm 12 into a notch portion 11a for pipe stop arm formed in the AWF unit baseplate 11.

If the electrode wire 1 is broken during machining, the detection-unit electrode 5 for detecting the distal end of the broken wire is closed so that the brake roller 6 is rotated in a wire rewinding direction (indicated by arrow 102 in FIG. 2) the moment the wire is broken, as shown in FIG. 2. Thereafter, the brake roller 6 is rotated in a wire delivery direction (indicated by arrow 101 in FIG. 3) to deliver the electrode wire 1, as shown in FIG. 3.

As the AWF pipe unit 10 descends as indicated by arrow 112 in FIG. 3 when the electrode wire 1 is cut, the AWF pipe nozzle 9 to which the bent wire 1 is delivered is lowered to a position just above the pickup unit 8. Further, the pipe stopper device 14 is activated in synchronism with the descending motion of the AWF pipe unit 10, thereby pushing out the pipe stop arm 12 in the direction of arrow 114 in FIG. 3.

The above operation reduces the distance 106 between the AWF pipe nozzle 9 and the pickup unit 8. Consequently, the distal end portion of the electrode wire 1 can easily pass through the frame of the pickup unit 8, so that derailing of the wire 1 can be avoided. To cut the distal end portion of the electrode wire 1, necessary electric power is supplied to a chuck-section cutting electrode 7 (first wire cutting electrode) and the detection-unit electrode 5 (second wire cutting electrode), whereupon that part of the wire 1 located between the electrodes 5 and 7 is heated.

Figure 4:
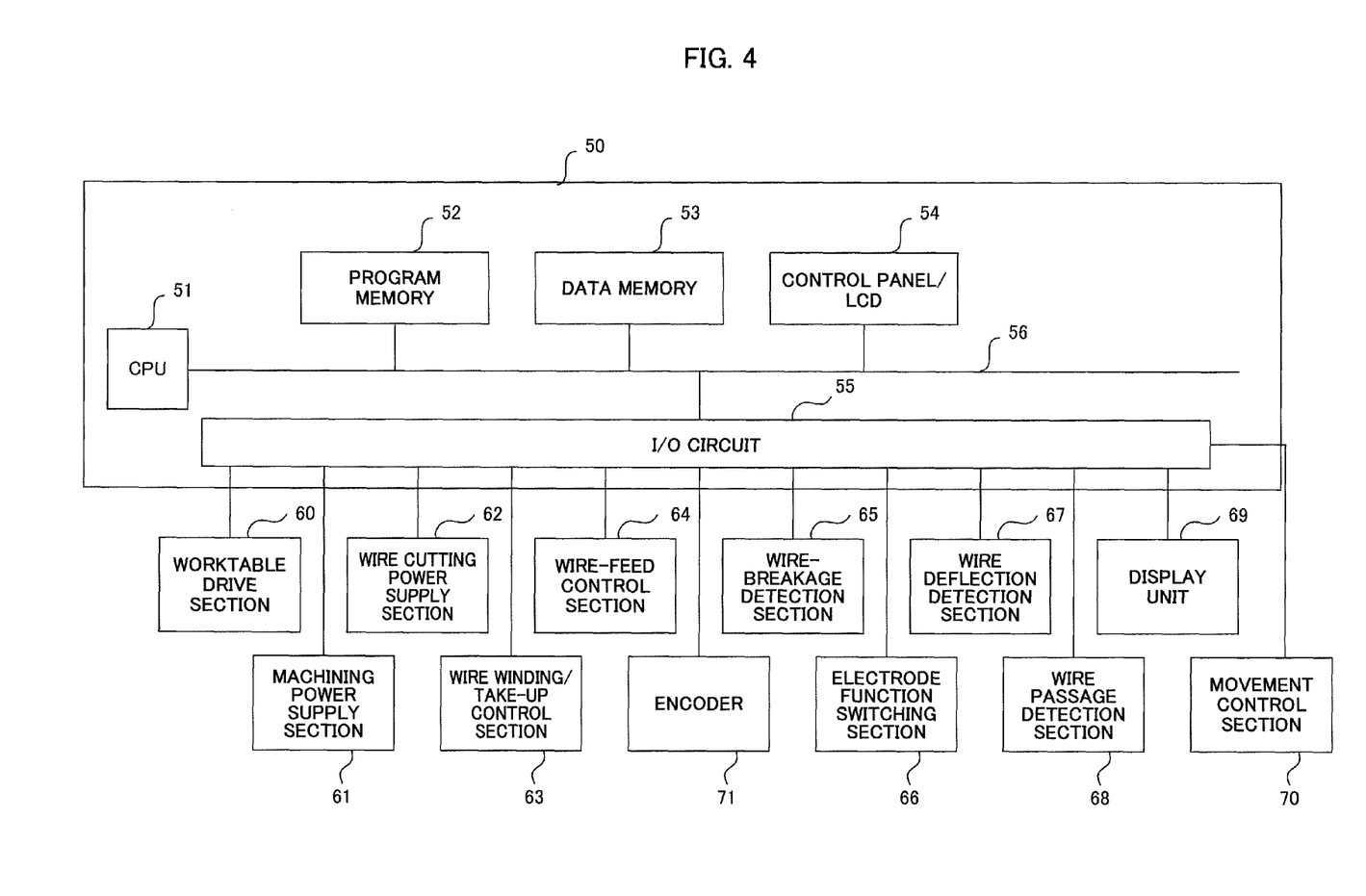
FIG. 4 is a diagram illustrating an outline of a wire electric discharge machine with the derailing prevention device shown in FIG. 3.

An outline of the wire electric discharge machine with the derailing prevention device will now be described with reference to FIG. 4.

A controller 50 of the wire electric discharge machine comprises a central processing unit (hereinafter simply referred to as "CPU") 51 formed of a microprocessor. A program memory 52, data memory 53, control panel 54 with liquid crystal display (LCD), and input/output circuit 55 are individually connected to the CPU 51 by a bus 56.

The program memory 52 is loaded with various programs for controlling various parts of the wire electric discharge machine and the controller 50 itself. The program memory 52 is further loaded with a program for synchronously activating wire breakage repairing of the electrode wire 1 and derailing prevention by the derailing prevention device 15.

Furthermore, the data memory 53 is loaded with various setting data for setting position data incidental to a machining program and other machining conditions. The data memory 53 is also used as a memory for temporary storage of data on various calculations by the CPU 51. The data memory 53 is further loaded with setting data in which whether wire breakage repairing is to be performed or not or whether the derailing prevention device is to be activated or not is set. Further, the data memory 53 has a register area for the calculation of output pulses of an encoder 71 and a register area that stores failure occurrence position data.

The input/output circuit 55 is connected with a worktable drive section 60, machining power supply section 61, wire cutting power supply section 62, wire winding/take-up control section 63, wire-feed control section 64, encoder 71, and wire-breakage detection section 65. The circuit 55 is further connected with an electrode function switching section 66, wire deflection detection section 67, wire passage detection section 68, display unit 69, and movement control section 70 for controlling various other parts of the wire electric discharge machine.

The worktable drive section 60 and the machining power supply section 61, having known configurations, are individually controlled by conventional methods during machining operation. The wire cutting power supply section 62 supplies necessary electric power to the chuck-section cutting electrode 7 and the detection-unit electrode 5 to cut the electrode wire 1 within a heating area in the AWF pipe 4 during wire connection. The wire winding/take-up control section 63 drives a winding motor (not shown) and a motor for driving a wire take-up roll.

The wire-feed control section 64 drivingly controls the motor for driving the wire take-up roll, and the encoder 71 detects the amount of rotation of this motor. The wire-breakage detection section 65 serves to detect wire breakage, if any, during machining operation, and is formed of a conventional mechanism (e.g., a system for detecting current flowing through the wire or a system for detecting the tension of the take-up roll).

The electrode function switching section 66 serves to switch the functions of the chuck-section cutting electrode 7; more specifically, causing the chuck-section cutting electrode 7 to serve as a wire cutting electrode or to serve as a wire passage detection electrode. The wire passage detection section 68 detects the potential of the electrode wire 1 when the wire is connected to a power supply for wire passage detection (not shown). On the other hand, the wire deflection detection section 67 is connected to an electrode for wire deflection detection (not shown) and serves to detect the change in the potential of this electrode, thereby determining whether or not the electrode and the electrode wire 1 are in contact with each other.

The display unit 69 is a display device for displaying wire-failure location data in various forms. It is used, for example, to display a real-time warning for a wire failure occurrence position or a graph representative of the frequency of occurrence of failure in each interval. The movement control section 70 is a collective term that represents those parts which control the drive of the brake roller 6, switching of the detection-unit electrode 5 for use as a cutting electrode, descent and ascent of the AWF pipe unit 10 at the time of connection of the electrode wire 1 (descent of the AWF pipe 4 and ascent of the pipe 4 after the end of the wire connection), pipe stopper device 14, pickup unit 8, etc.

The following is a description of modes of operation of the derailing prevention device 15 at the time of wire breakage repairing of the electrode wire 1.

(1) Programs for synchronously activating wire breakage repairing of the electrode wire 1 and derailing prevention by the derailing prevention device 15 are previously stored in the controller 50 of the wire electric discharge machine and are automatically activated in succession under the conditions of item (2) and the subsequent items.

(2) The moment the electrode wire 1 is broken, the detection-unit electrode 5 configured to detect the distal end of the broken wire 1 is closed (FIG. 2).

(3) Rewinding of the electrode wire 1 (i.e., rotation of the brake roller 6 in the wire rewinding direction) is started, and the rewinding is completed when the detection-unit electrode 5 is passed by the distal end of the wire 1 (FIG. 2).

(4) The upper guide 2 and a lower guide 18 are moved to their respective machining start points by driving drive axes of the wire electric discharge machine.

(5) A program for activating the derailing prevention device 15 is started.

(6) To cut the distal end portion of the broken electrode wire 1, the AWF pipe unit 10 starts to be lowered to the position just above the pickup unit 8, which is located below the detection-unit electrode 5, in synchronism with the operation of the pickup unit 8 for clamping the electrode wire 1.

(7) Since wire breakage repairing of the electrode wire 1 and derailing prevention by the derailing prevention device 15 are programmed to activate in synchronism with each other, the pipe stopper device 14 that constitutes the derailing prevention device 15 activates the air cylinder 13 to horizontally move the pipe stop arm 12 toward the electrode wire 1, in conjunction with the descending motion of the pickup unit 8. In this way, the distal end portion of the pipe stop arm 12 is inserted into the notch portion 11a of the AWF unit baseplate 11, as shown in FIG. 3. Thus, the working range of the AWF pipe unit 10 can be controlled from the standard position shown in FIGS. 1 and 2 to the position just above the pickup unit 8, as shown in FIG. 3. If a wire derailing prevention program is started, the frame-like portion of the pickup unit 8 moves so that an extension of the AWF pipe nozzle 9 penetrates the frame of the pickup unit 8.

(8) The electrode wire 1 is delivered from the AWF pipe unit 10, which is lowered to the position of the pickup unit 8, in order that its distal end is processed. The broken electrode wire 1 can be delivered at point-blank range into the frame of the pickup unit 8 even if its distal end is extremely bent by breakage, as indicated by a broken line 105 in FIG. 3. Accordingly, the electrode wire 1 can be reliably clamped in the frame of the pickup unit 8, so that its clamped distal end can be annealed or cut.

(9) After the electrode wire 1 is cut, the pipe stopper device 14 is disengaged and shifted to a connection mode according to a wire-breakage repairing program. After connection is completed, the upper and lower guides 2 and 18 return to a breakage position and machining is restarted, whereupon wire breakage repairing is completed.

Figure 5A:
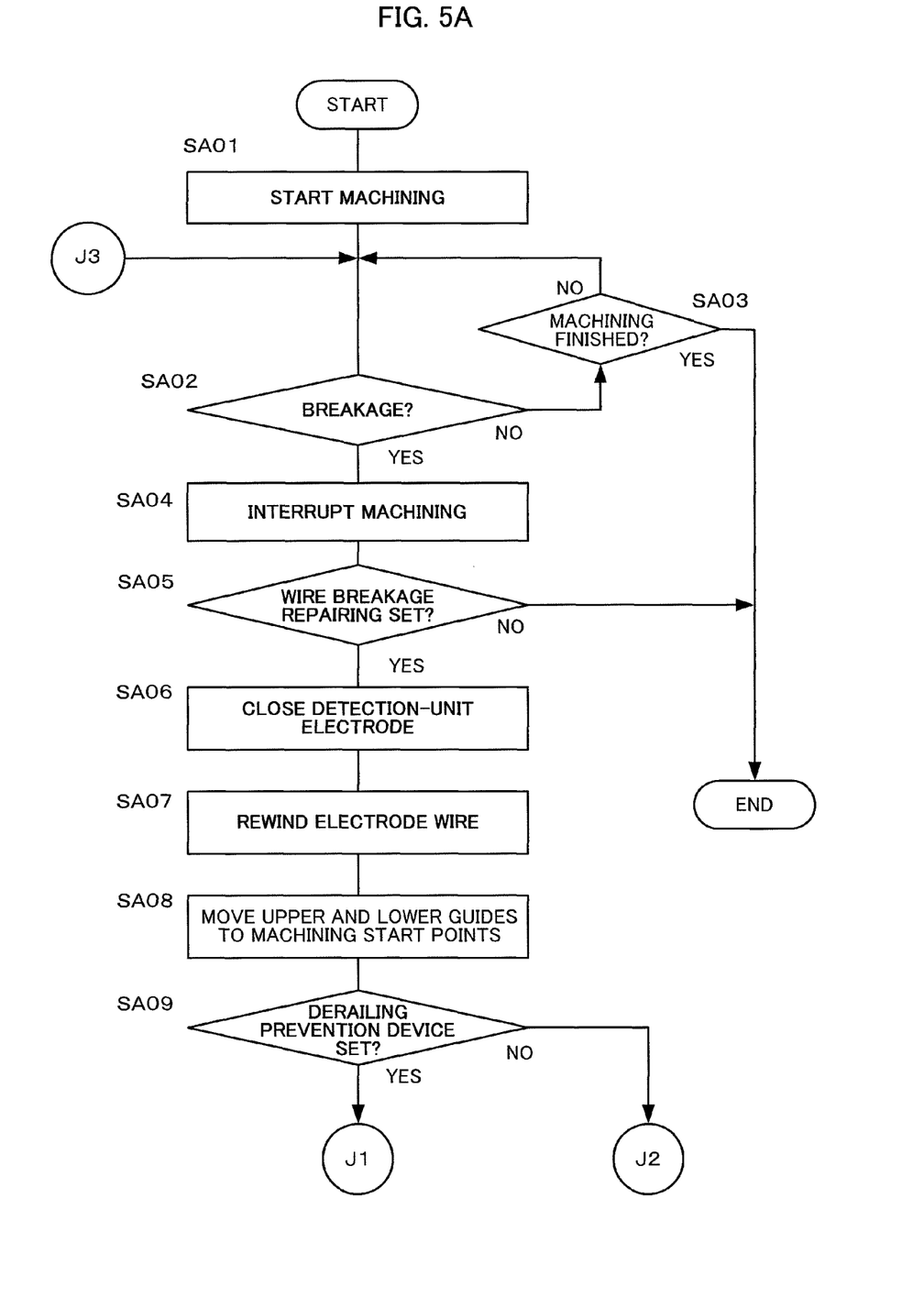
FIGS. 5A to 5C are flowcharts illustrating the operation of the wire derailing prevention device shown in FIG. 1 at the time of wire breakage repairing.
Figure 5B:
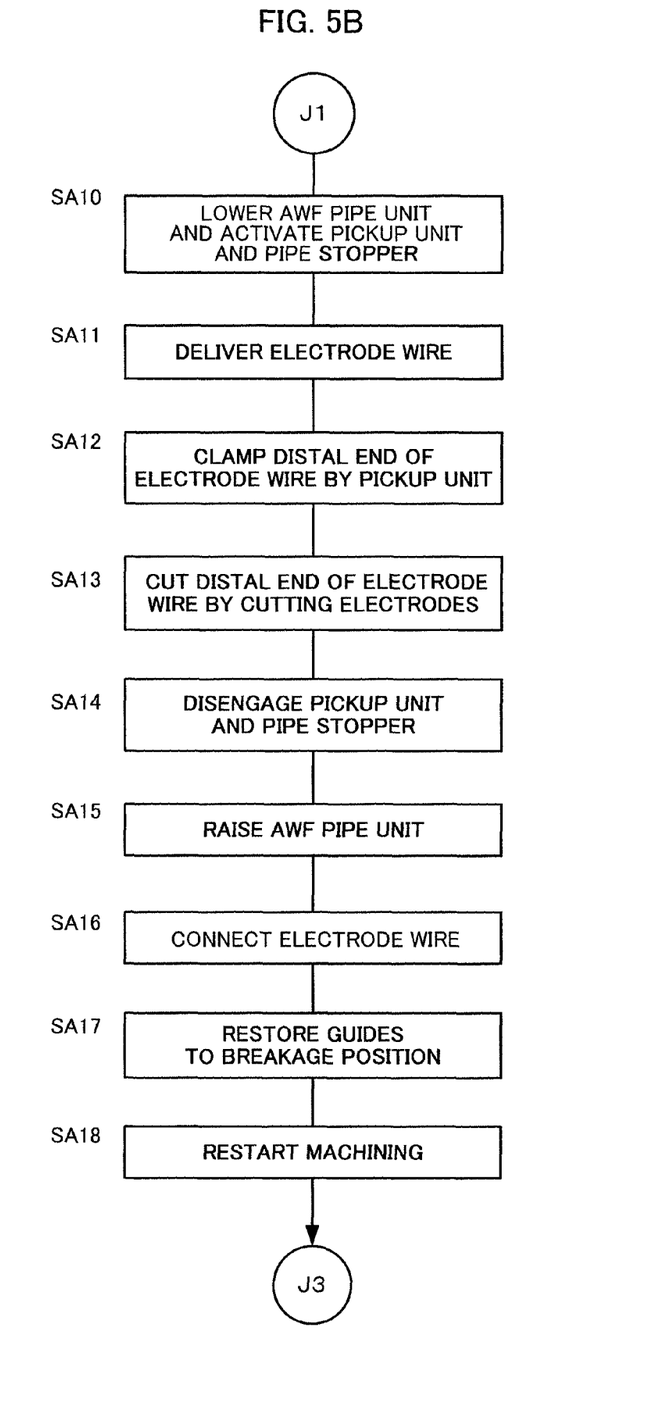
Figure 5C:
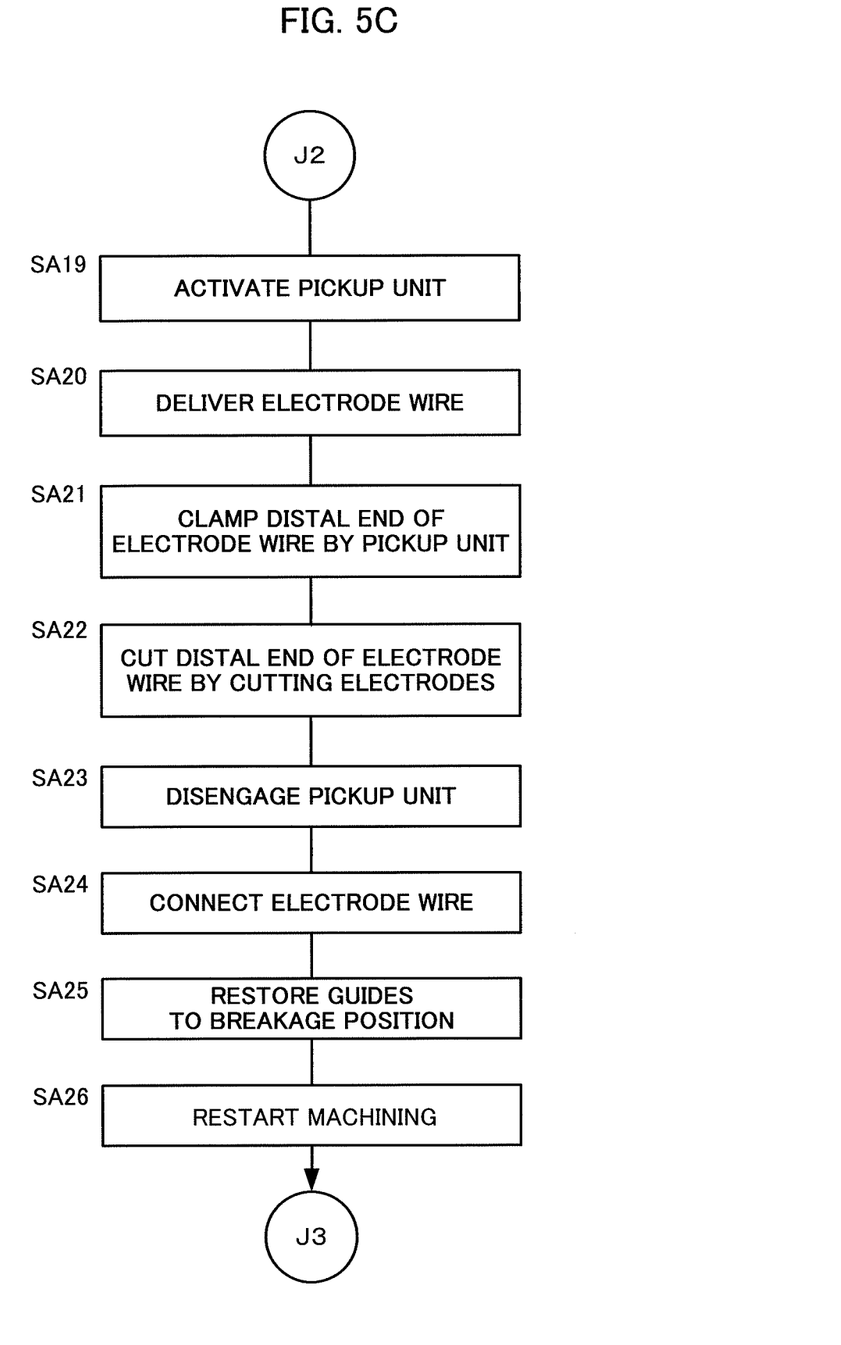

The operation of the derailing prevention device 15 of FIG. 1 at the time of wire breakage repairing will be described with reference to the flowcharts of FIGS. 5A to 5C. The flowcharts of FIGS. 5A to 5C illustrate the above-described operation modes under the conditions (1) to (9). The following is a sequential description of various steps of operation. [Step SA01] Wire electric discharge machining is started.

[Step SA02] Occurrence or non-occurrence of breakage of the electrode wire 1 is detected during the machining. If the occurrence of breakage is detected (YES), the program proceeds to Step SA04. If not (NO), the program proceeds to Step SA03.

[Step SA03] It is determined whether or not machining based on the machining program is finished. If the machining is finished (YES), this processing ends. If not (NO), the program returns to Step SA02.

[Step SA04] The wire electric discharge machining is interrupted.

[Step SA05] It is determined whether or not wire breakage repairing is set. If setting is confirmed (YES), the program proceeds to Step SA06. If not (NO), this processing ends. The setting for whether or not to perform wire breakage repairing is stored in advance.

[Step SA06] The detection-unit electrode 5 is closed. [Step SA07] The brake roller 6 is rotated in the wire rewinding direction to rewind the electrode wire 1.

[Step SA08] The upper and lower guides 2 and 18 are moved to the machining start points.

[Step SA09] It is determined whether or not the derailing prevention device 15 is set. If setting is confirmed (YES), the program proceeds to Step SA10. If not (NO), the program proceeds to Step SA19. The setting for whether or not to start the derailing prevention device 15 is stored in advance.

[Step SA10] The AWF pipe unit 10 is lowered and the pickup unit 8 and the pipe stopper device 14 are activated.

[Step SA11] The brake roller 6 is rotated in the wire delivery direction to deliver the electrode wire 1.

[Step SA12] The distal end of the electrode wire 1 is clamped by the pickup unit 8.

[Step SA13] The distal end of the electrode wire 1 is cut by the cutting electrodes 5 and 7.

[Step SA14] The pickup unit 8 and the pipe stopper device 14 are disengaged.

[Step SA15] The AWF pipe unit 10 is raised.

[Step SA16] The electrode wire 1 is connected.

[Step SA17] The upper and lower guides 2 and 18 are restored to the breakage position.

[Step SA18] Machining is restarted, whereupon the program returns to Step SA02.

[Step SA19] The pickup unit 8 is activated.

[Step SA20] The brake roller 6 is rotated in the wire delivery direction to deliver the electrode wire 1.

[Step SA21] The distal end of the electrode wire 1 is clamped by the pickup unit 8.

[Step SA22] The distal end of the electrode wire 1 is cut by the cutting electrodes 5 and 7.

[Step SA23] The pickup unit 8 is disengaged.

[Step SA24] The electrode wire 1 is connected.

[Step SA25] The upper and lower guides 2 and 18 are restored to the breakage position.

[Step SA26] Machining is restarted, whereupon the program returns to Step SA02.

The invention claimed is:

1. A wire electric discharge machine with a wire electrode cutting mechanism, comprising:
    an automatic wire-connection pipe disposed upstream relative to an upper guide, having a nozzle on a distal end thereof, and movable between an automatic wire connection position near the upper guide and a retracted position;
    first and second wire cutting electrodes disposed on the inlet and outlet sides, respectively, of the automatic wire-connection pipe;
    a pickup unit disposed below the second wire cutting electrode and configured to clamp a wire electrode to be cut thereby; and
    a stopper mechanism configured to regulate a movement of the automatic wire-connection pipe so that the distal end of the nozzle of the automatic wire-connection pipe is located between the second wire cutting electrode and the pickup unit when the wire electrode is cut,
    wherein the stopper mechanism comprises:
        a notch portion on a mounting base on which the automatic wire-connection pipe is mounted, and
        a cylinder mechanism moveable toward and away from the notch portion.

2. The wire electric discharge machine according to claim 1, wherein the cylinder mechanism is configured to be driven by water or oil pressure.

3. The wire electric discharge machine according to claim 1, wherein the cylinder mechanism is configured to be driven by a servomotor.

4. A wire electric discharge machine with a wire electrode cutting mechanism, comprising:
    an automatic wire-connection pipe disposed upstream relative to an upper guide, having a nozzle on a distal end thereof, and movable between an automatic wire connection position near the upper guide and a retracted position;
    first and second wire cutting electrodes disposed on the inlet and outlet sides, respectively, of the automatic wire-connection pipe;
    a pickup unit disposed below the second wire cutting electrode and configured to clamp a wire electrode to be cut thereby; and
    a stopper mechanism configured to regulate a movement of the automatic wire-connection pipe so that the distal end of the nozzle of the automatic wire-connection pipe is located between the second wire cutting electrode and the pickup unit when the wire electrode is cut,
    wherein the stopper mechanism is a hand attached to a robot, and the automatic wire-connection pipe is held by the hand.

* * * * *